(12) United States Patent
Cnossen et al.

(10) Patent No.: US 7,005,455 B2
(45) Date of Patent: Feb. 28, 2006

(54) REGENERATION OF PARTIAL OXIDATION CATALYSTS

(75) Inventors: Robin G. Cnossen, Ponca City, OK (US); Lisa M. Carmichael, Ponca City, OK (US)

(73) Assignee: ConocoPhillips Company, Houston, TX (US)

(*) Notice: Subject to any disclaimer, the term of this patent is extended or adjusted under 35 U.S.C. 154(b) by 443 days.

(21) Appl. No.: 10/278,634

(22) Filed: Oct. 23, 2002

(65) Prior Publication Data
US 2004/0082670 A1 Apr. 29, 2004

(51) Int. Cl.
*C07C 27/00* (2006.01)
*C07C 1/00* (2006.01)

(52) U.S. Cl. .................................................. 518/700
(58) Field of Classification Search ............... 518/700, 518/702, 703, 709; 252/373
See application file for complete search history.

(56) References Cited

U.S. PATENT DOCUMENTS

| | | | |
|---|---|---|---|
| 4,094,821 A | 6/1978 | McVicker et al. | 252/466 |
| 4,255,289 A | 3/1981 | Balinsky et al. | 252/466 |
| 4,787,969 A | 11/1988 | Baird, Jr. | 208/139 |
| 6,293,979 B1 * | 9/2001 | Choudhary et al. | 48/198.7 |
| 6,323,248 B1 | 11/2001 | Mart et al. | 518/709 |
| 6,632,765 B1 * | 10/2003 | Chen | 502/53 |

FOREIGN PATENT DOCUMENTS

| | | |
|---|---|---|
| GB | 1 399 137 | 7/1972 |
| JP | 52092016 | 8/1977 |
| WO | WO 02/20395 A2 | 3/2002 |

OTHER PUBLICATIONS

European Search Report for European Application EP 03 25 6715 dated Feb. 5, 2004 (7 p.).
Catalytic Partial Oxidation of natural Gas to Syngas, Fuel Processing Technology 42 (1995) pp. 109-127.

* cited by examiner

*Primary Examiner*—J. Parsa
(74) *Attorney, Agent, or Firm*—Conley Rose P.C.

(57) ABSTRACT

The present invention relates to a process for the preparation of synthesis gas (i.e., a mixture of carbon monoxide and hydrogen), typically labeled syngas. More particularly, the present invention relates to a regeneration method for a syngas catalyst. Still more particularly, the present invention relates to the regeneration of syngas catalysts using a re-dispersion technique. The re-dispersion technique involves the formation and removal of carbonyls with the active metals. The carbonyl formation and removal effectively re-disperses the catalyst metal.

51 Claims, 2 Drawing Sheets

REGENERATION OF PARTIAL OXIDATION CATALYSTS

CROSS-REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

The present invention relates to a process for the preparation of synthesis gas (i.e., a mixture of carbon monoxide and hydrogen), typically labeled syngas. More particularly, the present invention relates to novel methods of regenerating a partial oxidation catalysts via chemical re-dispersion of the catalytic metals. In addition, the present invention can be used for in-situ regeneration of a partial oxidation catalyst without any downtime in production.

BACKGROUND OF THE INVENTION

Catalysis is literally the lifeblood for many industrial/commercial processes in the world today. The most important aspect of a catalyst is that it can increase the productivity, efficiency and profitability of the overall process by enhancing the rate, activity and/or selectivity of a given reaction. Many industrial/commercial processes involve reactions that are simply too slow and/or inefficient to be economical without a catalyst present. For example, the process of converting natural gas or methane to liquid hydrocarbons (an extremely desirable process) necessarily involves several catalytic reactions.

The conversion of methane to hydrocarbons is typically carried out in two steps. In the first step, methane is catalytically converted to carbon monoxide and hydrogen (i.e., synthesis gas or syngas). In a second step, the syngas intermediate is catalytically converted to higher hydrocarbon products by processes such as the Fischer-Tropsch Synthesis or to other chemicals by processes such as an alcohol synthesis. For example, fuels such as hydrocarbon waxes and liquid hydrocarbons comprised in the middle distillate range, i.e., kerosene and diesel fuel, may be produced from the synthesis gas.

Current industrial use of methane as a chemical feedstock for syngas production proceeds by the initial conversion of methane to carbon monoxide and hydrogen by either steam reforming or dry reforming. Steam reforming currently is the major process used commercially for the conversion of methane to synthesis gas, the reaction proceeding according to Equation 1.

$$CH_4 + H_2O \leftrightarrow CO + 3H_2 \quad (1)$$

The catalytic partial oxidation ("CPOX") of hydrocarbons, e.g., methane or natural gas, to syngas has also been described in the literature. In catalytic partial oxidation, natural gas is mixed with air, oxygen-enriched air, or oxygen, and introduced to a catalyst at elevated temperature and pressure. The partial oxidation of methane yields a syngas mixture with a more preferable $H_2:CO$ ratio of 2:1, as shown in Equation 2:

$$CH_4 + 1/2 O_2 \leftrightarrow CO + 2H_2 \quad (2)$$

The $H_2:CO$ ratio for this reaction is more useful for the downstream conversion of syngas to fuels or to chemicals such as methanol than is the $H_2:CO$ ratio from steam reforming. However, both reactions continue to be the focus of research in the world today.

As stated above, these reactions are catalytic reactions and the literature is replete with varying catalyst compositions. The catalyst compositions typically are comprised of at least one catalytically active metal, such as a Group VIII metal. Many catalyst compositions also have other promoters present. Catalytic metals are typically selected based on their activity and selectivity towards a particular reaction. Further, the catalyst compositions typically include particular support materials such as alumina, silica, titania, etc., that can also enhance the catalyst activity.

After a period of time in operation, a catalyst will become deactivated, losing its effectiveness for catalyzing the desired reaction to a degree that makes the process uneconomical at best and inoperative at worst. This process is generally known as "aging." The more aged a particular catalyst the less efficient the catalyst is at enhancing the reaction, i.e., less activity it has. At this point, the catalyst can be either replaced or regenerated. However, replacing a catalyst typically means discarding the deactivated catalyst. Even if a fresh replacement catalyst is ready and available, a single syngas reactor will typically have to be shut down and offline for days to weeks. The time delay is due at least in part to the time required for simple cooling and heating of the reactor.

In addition, a discarded catalyst represents a loss of expensive metals. Alternatively, the user may send the catalyst back to the supplier for recovery of expensive metals, such as Rh, Pt, Pd, etc. However, the recovery process involves dissolving the multi-component catalyst and subsequent separation of the active components from the mixed solution. The chemistry is complex and costly, more importantly, it involves bulk amounts of harsh chemicals that ultimately must be discarded and the use of landfills for such disposal is problematic. For example, the environmental protection agency (EPA) "Land Ban" imposes restrictions on disposal because these harsh chemicals can release toxins into the environment. For all of these reasons, regeneration is preferred over replacement.

However, regeneration has problems as well. Like replacement, regeneration typically requires some downtime resulting in a decrease in production. In addition, regeneration may not be available for every deactivated catalyst. Catalyst systems can become deactivated by any number of mechanisms. Some of the more common deactivating mechanisms include coking, sintering, poisoning, oxidation, and reduction. The process chiefly responsible for deactivation varies among catalyst systems. Some catalysts that have been deactivated can be regenerated and/or the deactivation reaction can be reversed. However, many regeneration processes are not economically feasible.

Sintering as a cause of deactivation traditionally has been viewed as a non-reversible phenomenon, since a sintered catalyst is particularly difficult to regenerate. In terms of synthesis gas catalysts, sintering is usually the result of the high temperatures within the catalyst bed. The syngas reactions achieve very high temperatures during operation. Temperatures within a syngas catalyst bed typically reach temperatures in excess of 1000° C. Sintering for syngas catalysts is therefore practically unavoidable. There are similarly potential deactivation issues with other catalytic partial oxidation reactions that take place at high temperature.

Because regeneration has traditionally been so difficult, the active metals are typically dissolved and recaptured for use in new catalyst batches. However, research is continuing on the development of more efficient syngas catalyst systems and catalyst systems that can be more effectively regenerated. To date there are no known methods that are economically feasible for regenerating a partial oxidation catalyst, such as a syngas catalyst.

Hence, there is still a great need to identify new regeneration methods, particularly methods that are quick and effective for regenerating deactivated partial oxidation catalysts without having to dissolve the catalyst components and without significant downtime or loss of production.

SUMMARY OF THE INVENTION

The present invention relates to a process for the preparation of synthesis gas (i.e., a mixture of carbon monoxide and hydrogen), typically labeled syngas. More particularly, the present invention relates to novel methods of regenerating partial oxidation catalysts via chemical re-dispersion of the catalytic metals. In addition, the present invention can be used for in-situ regeneration of a partial oxidation catalyst with little to no downtime in production.

The regeneration of the partial oxidation catalysts is accomplished by passing a gas over a deactivated catalyst that restores the catalytic metal to its active form and/or restores active surface area of the catalytic metals lost from deactivation phenomenon. Suitable regeneration gases include but are not limited to carbon monoxide, hydrogen, oxygen, syngas and steam. The present invention is primarily directed towards partial oxidation catalysts used preferably in partial oxidation reactions of hydrocarbons or hydrogen sulfide or combinations and even more preferably used in syngas catalysts that contain Group VIII, noble metals or combinations thereof.

Sometimes it may be necessary or just advantageous to use a multiple step regeneration process in which the deactivated catalysts are exposed to more than one type of gas in a stepwise fashion. For example, one embodiment of the present invention would be to expose the deactivated partial oxidation catalyst to an oxidizing gas followed by a reducing gas.

In yet another preferred embodiment of the present invention, a synthesis gas reaction is carried out producing primarily hydrogen and carbon monoxide, i.e., syngas. A slip stream of the syngas product is removed, resulting in a primary syngas product stream and a small secondary syngas stream, the slip stream. The slip stream is separated to produce a hydrogen rich stream and a carbon monoxide rich stream. The hydrogen rich stream can then be used for in-situ regeneration or activation of a second partial oxidation catalyst. The excess hydrogen rich gas from the regeneration or activation process can be re-introduced into the primary syngas stream from the first reactor along with the carbon monoxide rich stream. The primary syngas stream can then be introduced into a Fischer-Tropsch reactor to produce liquid hydrocarbons.

In the most preferred embodiment of the present invention, more than one partial oxidation reactor is used, allowing continuous production even during the regeneration process. For example, one syngas reactor produces syngas, which in turn is partially used to obtain a hydrogen rich regeneration gas. The hydrogen rich gas is passed over the deactivated catalyst in a second syngas reactor for regeneration. When the catalyst in the first syngas reactor is deactivated, the process can be reversed. The second syngas reactor produces the syngas and thus hydrogen rich gas. The hydrogen rich gas is then used to regenerate the catalyst in the first syngas reactor. This type of cycle can be repeated indefinitely or until the catalyst can no longer be regenerated.

These and other embodiments, features and advantages of the present invention will become apparent with reference to the following detailed description and drawings.

BRIEF DESCRIPTION OF THE DRAWINGS

For a more detailed description of the preferred embodiment of the present invention reference will now be made to the accompanying Figures.

DETAILED DESCRIPTION OF THE PREFERRED EMBODIMENTS

There are shown in the Figures, and herein will be described in detail, specific embodiments of the present invention, with the understanding that the present disclosure is to be considered an exemplification of the principles of the invention, and is not intended to limit the invention to that illustrated and described herein. The present invention is susceptible to embodiments of different forms or order and should not be interpreted to be limited to the particular structures or compositions contained herein. In particular, various embodiments of the present invention provide a number of different configurations of the overall gas to liquid conversion process.

The regeneration of a partial oxidation catalyst is accomplished by passing a gas over a deactivated catalyst that restores the catalytic metal to its active form and/or restores active surface area of the catalytic metals lost from deactivation phenomenon. The present invention is primarily directed towards partial oxidation catalysts used in partial oxidation reactions of hydrocarbons or hydrogen sulfide or combinations thereof and even more preferably towards catalysts that contain Group VIII or noble metals that are used in partial oxidation reactions of natural gas or methane to produce syngas. The partial oxidation catalyst preferably contains one or more of the following metals: rhodium, ruthenium, platinum, palladium, iridium, nickel, cobalt, with optional promoters.

According to the present invention, a syngas reactor can comprise any of the synthesis gas technology and/or methods known in the art. The hydrocarbon-containing feed is almost exclusively obtained as natural gas. However, the most important component is generally methane. Methane or other suitable hydrocarbon feedstocks (hydrocarbons with four carbons or less) are also readily available from a variety of other sources such as higher chain hydrocarbon liquids, coal, coke, hydrocarbon gases, etc., all of which are clearly known in the art. Similarly, the oxygen-containing gas may come from a variety of sources and will be somewhat dependent upon the nature of the reaction being used. For example, a partial oxidation reaction requires diatomic oxygen as a feedstock, while steam reforming requires only steam. According to the preferred embodiment of the present invention, partial oxidation is assumed for at least part of the syngas production reaction.

Regardless of the source, the hydrocarbon-containing feed and the oxygen-containing feed are reacted under catalytic conditions. The catalyst compositions useful for synthesis gas reactions are well known in the art. They generally are comprised of a catalytic metal that has been reduced to its active form and one or more promoters on a support structure. The most common catalytic metals are Group VIII metals or noble metals. The support structures may be monoliths, wire mesh or particulates. Often, the support selected will dictate the type of catalyst bed that must be used. For example, fixed beds are comprised of monoliths and large particle sized supports. Supports comprised of small particles tend to be more useful in fluidized beds. The support matrix is usually a metal oxide or mixture of metal oxides, such as alumina, titania, zirconia, or the like.

The synthesis gas feedstocks are generally preheated, mixed and passed over or through the catalyst beds. As the mixed feedstocks contact the catalyst, the synthesis reactions take place. The synthesis gas product contains primarily hydrogen and carbon monoxide, however, many other minor components may be present including steam, nitrogen, carbon dioxide, ammonia, hydrogen cyanide, etc., as well as unreacted feedstock, such as methane and/or oxygen. The synthesis gas product, i.e., syngas, is then ready to be used, treated, or directed to its intended purpose. For example, in the instant case some or all of the syngas may be used to prepare regeneration gases for the present invention or may be used as a feedstock for a Fischer-Tropsch process or an alcohol synthesis plant.

The syngas-containing stream when leaving a syngas reactor is typically at a temperature of about 600–1500° C. The syngas must be transitioned to be useable in synthesis reactor downstream of the syngas reactor such as a Fischer-Tropsch or other synthesis reactors e.g. an alcohol synthesis reactor, which operate at lower temperatures of about 200° C. to 400° C. The syngas is typically cooled, dehydrated (i.e., taken below 100° C. to knock out water) and compressed during the transition phase. Thus, in the transition of syngas from the syngas reactor to a synthesis reactor, the syngas stream may experience a temperature window of 50° C. to 1500° C.

Several reactions have been discovered that can restore the activity to a deactivated syngas catalyst depending on the deactivation phenomenon. The applicants believe that the methods disclosed herein to regenerate a syngas catalyst are applicable to any partial oxidation catalyst, which loses its activity due to the same or similar deactivation mechanisms. For example, catalytic metals are often oxidized as a result of the syngas reaction, which results in at least two problems, namely, the loss of the "active state" (reduced) of the catalytically active metals, and the loss of catalytically active surface area. Noble metals are preferred as the primary catalytic metals for syngas catalyst compositions. Noble metals form metal oxides under syngas reactor conditions. In addition, the preparation of a noble metal-containing syngas catalyst often includes at least one calcining step that will oxidize the noble metal. Calcination results in metal oxides. Thus, sometimes the catalytic metals are not in the fully active form even before exposure to the syngas reactions. In any event, the noble metal oxides will still catalyze the syngas reaction, however, the activity of the reduced metal, generally considered the active species, is greatly preferred.

Also, oxidation of the syngas catalytic metals can result in the loss of catalytically active surface area. As the noble metal oxides are formed, other oxides can be forming simultaneously, i.e., oxides of secondary catalytic metal or promoter metal. Due to the mobility of these metal particles, the noble metals are often physically "covered" by other metal oxides, further decreasing the amount of active surface area available for catalytic participation.

Thus, according to one embodiment of the present invention, a hydrogen-rich gas is passed over deactivated syngas catalysts as the primary regeneration gas. It is believed that the hydrogen exposure results in at least one of two phenomena that can help restore the activity back to the overall catalyst composition. First, the oxidized noble metal particles are "uncovered" or brought back toward to the surface of the support. "Surface" in this context is intended to mean the place where the metal particle will have exposure to the reactant gases. In other words, surface is not limited to the outer surface of a spherical support particle, and could also be the inner surface of a pore or microfracture within the support particle or structure such that the syngas reactants could be exposed to the particle and react. The catalytic metals tend to migrate towards the surface and are reduced under the hydrogen gas. Second, as the hydrogen reduction reaction reduces the metal particles they re-disperse. Thus, more of the noble metal particles are reduced to the more active form and dispersed on and through the support to achieve the high amount of surface area needed for the syngas reaction.

The hydrogen rich gas may be obtained or produced from any available source including, but not limited to, recycled gas streams, bottled gas, produced syngas, Fischer-Tropsch tailgas, hydroprocessing tailgas, hydrogen-rich streams from an alcohol synthesis plant, an olefin synthesis plant, a carbon filaments/carbon fibers synthesis plant, an aromatic synthesis plant, or the like. The purity of the hydrogen rich gas is not critical, but it is preferred that the hydrogen rich gas be oxygen free. A secondary preference is that the hydrogen rich gas be also carbon free. It will be understood by those skilled in the art that gases cannot ever be absolutely free of impurities, including oxygen or carbon. Likewise, the present invention does not assert or contemplate such an extreme position. It is intended that these impurities are substantially eliminated to the point that side reactions associated with their presence do not significantly alter or inhibit the effective regeneration of the catalyst metal according to the present invention.

According to another embodiment of the present invention, a hydrocarbon-rich gas is passed over deactivated partial oxidation catalysts as the primary regeneration gas. Preferably the hydrocarbon-rich gas is natural gas, mixtures of $C_1$–$C_{10}$ hydrocarbons, methane, or combinations thereof. It is believed that the hydrocarbon-rich gas creates a reducing environment thereby reducing the metal particles.

Figure 1:
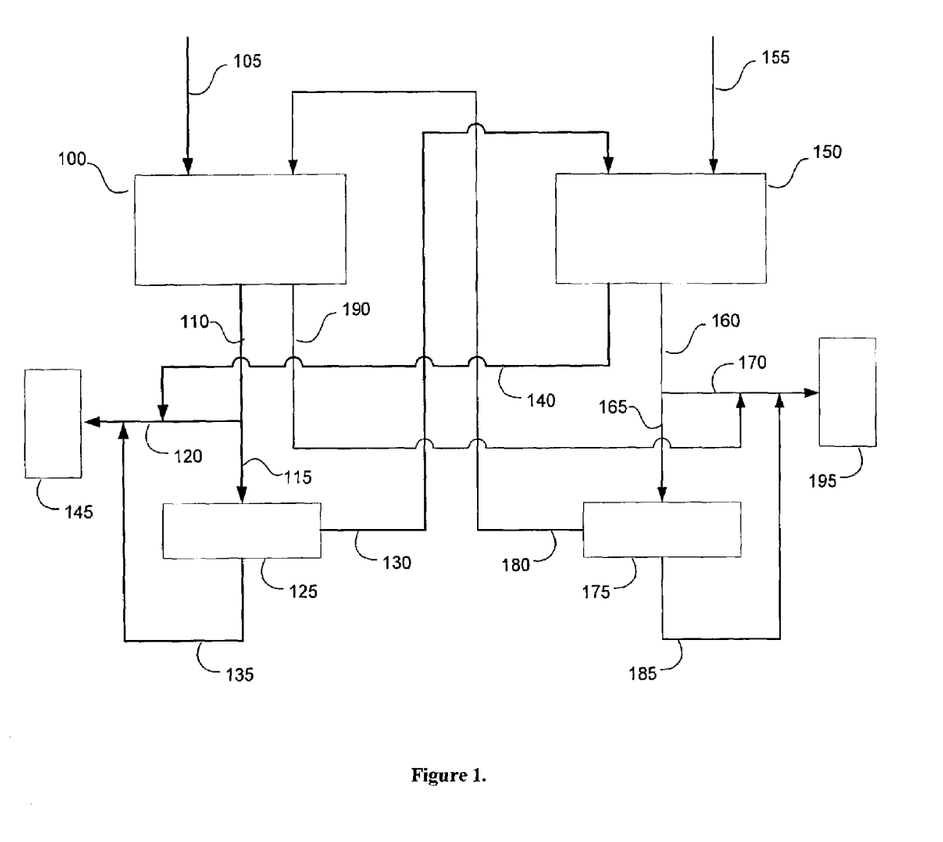
FIG. 1 is a block flow diagram of a hydrocarbon gas to liquid conversion process in accordance with one embodiment of the present invention.

FIG. 1 shows a block flow diagram in accordance with one preferred embodiment of the present invention. The flow diagram is of a gas to liquid conversion process that includes a method for in-situ regeneration or activation of a syngas catalyst. Syngas can be generated by a catalytic reaction between a hydrocarbon-containing gas and an oxygen-containing gas and optionally steam. The hydrocarbon containing gas can be any hydrocarbon containing gas in which the hydrocarbon content is substantially $C_4$ or less. The more preferred hydrocarbon containing gases are natural gas or methane. The oxygen containing gas can be air or oxygen and is preferably oxygen.

The hydrocarbon containing gas and oxygen containing gas (collectively "syngas feedstock") are introduced into a first syngas reactor 100 through line 105. It should be appreciated that these gases are typically mixed very near in time to exposure to the syngas catalyst. FIG. 1 is intended merely as a flow diagram and not intended to disclose these kinds of details that are well known in the art and by those of ordinary skill. The syngas feedstocks are catalytically reacted in a first syngas reactor 100 to produce primarily hydrogen and carbon monoxide, i.e., syngas.

The produced syngas exits through line 110 and is then passed to a Fischer-Tropsch reactor 145 via line 120. Again, it should be appreciated that other details such as preparation of the syngas as a Fischer-Tropsch feedstock in terms of temperature, pressure, water knock-out, etc., are presumed to be understood by those of ordinary skill in the art.

A slip stream of syngas is removed from line 110 and passed into a gas separation unit 125 through line 115. The type of separation used in unit 125 is not critical to the present invention and may include any physical and/or chemical means of separation such as membranes, adsorption-desorption techniques, water gas shift reactors, and the like. In the most preferred embodiment, gas separation unit 125 comprises a membrane separator. Membranes are well known in the art to be highly selective to hydrogen, typically greater than 70%. With the hydrogen removed, the remaining syngas will be carbon monoxide rich. Thus, the gas separation unit 125 produces a hydrogen rich permeate stream and a carbon monoxide rich stream.

The carbon monoxide rich stream exits the gas separation unit 125 through line 135. The carbon monoxide rich stream can be sent to flare, used as a feedstock or reactant for various reactions, but is preferably re-introduced into line 120.

In accordance with the most preferred embodiment of the present invention, the hydrogen rich permeate stream is removed and introduced into a second syngas reactor 150 via line 130. The hydrogen rich gas is passed over a syngas catalyst located within second syngas reactor 150 for regeneration or activation of the syngas catalyst. The excess hydrogen rich gas will pass through the second syngas reactor 150 and exit though line 140. The excess hydrogen rich gas will then preferably be re-introduced into line 120.

Regulation of lines 135 and 140 can be used to adjust the hydrogen to carbon monoxide molar ratio in primary syngas stream 120 prior to introduction into the Fischer-Tropsch reactor 145. For example, if more hydrogen is needed in the primary syngas stream 120, the carbon monoxide rich gas 135 will be decreased by lowering the flow rate, sending some or all to flare, or simply redirecting the gas for other purposes. As the flow rate of carbon monoxide stream 135 is decreased, the flow rate of hydrogen rich stream 140 will be increased as needed to achieve the desired ratio. Likewise, more carbon monoxide can be added from line 135 and less hydrogen from line if the reverse situation is desired. By re-introducing the carbon monoxide and hydrogen rich streams 135 and 140, respectively, the present invention has the advantage of regenerating the deactivated catalyst using readily available in-house gases while losing very little in terms of final products.

According to the present invention, the time necessary for in-situ regeneration of the syngas catalyst in reactor 150 will be primarily dependent on the volume of catalyst and flow and concentration of hydrogen passing over the catalyst. Under normal operating conditions, i.e., the space velocities for the gas flow, stated as gas hourly space velocity (GHSV), are from about 20,000 to about 100,000,000 hr$^{-1}$, preferably from about 100,000 to about 25,000,000 hr$^{-1}$ a temperature of about 25° C. to about 1500° C., preferably less than 1000° C., more preferably less than 600° C., and a pressure of about 25 psig to about 250 psig, it is anticipated that the time necessary to regenerate a catalyst bed of less than 1 foot in length will be less than 24 hours. Once regenerated, the second syngas reactor 150 can be used to produce syngas for the regeneration of the catalyst in the first syngas reactor 100 when the catalyst becomes deactivated. The process described above is simply reversed as described below.

The syngas feedstocks are introduced into the second syngas reactor 150 through line 155. The syngas feedstocks are catalytically reacted in syngas reactor 150 to produce syngas. The produced syngas exits through line 160 and is then passed to a synthesis reactor 195 via line 170. A slip stream of syngas is removed from line 160 and passed into a regenerating gas recovery separation unit 175 through line 165. Again, the type of separation and/or purification used is not critical to the present invention and may include any physical and/or chemical means of separation such as membranes, adsorption-desorption techniques, water gas shift reactors, and the like. Thus, the gas separation unit 175 will produce a hydrogen rich permeate stream and a carbon monoxide rich stream.

The carbon monoxide rich stream exits the gas separation unit 175 through line 185. The carbon monoxide rich stream can be sent to flare, used as a feedstock or reactant for various reactions, but is preferably re-introduced into line 170.

In accordance with the most preferred embodiment of the present invention, the hydrogen rich permeate stream is removed and introduced into the first syngas reactor 100 via line 180. The hydrogen rich gas is passed over a syngas catalyst located with the first syngas reactor 100 for regeneration or activation of the syngas catalyst. The excess hydrogen rich gas will pass through the first syngas reactor 100 and exit though line 190. The excess hydrogen rich gas will then preferably be re-introduced into line 170.

As before, regulation of lines 185 and 190 can be used to adjust the hydrogen to carbon monoxide molar ratio in the primary syngas stream 170 prior to introduction into the synthesis reactor 195. For example, if more hydrogen is needed in the primary syngas stream 170, the carbon monoxide rich gas 185 will be decreased by lowering the flow rate, sending some or all to flare, or simply redirecting the gas for other purposes. As the flow rate of carbon monoxide stream 185 is decreased, the flow rate of hydrogen rich stream 190 will be increased as needed to achieve the desired ratio. Likewise, more carbon monoxide can be added from line 185 and less hydrogen from line 190 if the reverse situation is desired.

The synthesis reactor 145 or 195 can comprise any of the Fischer-Tropsch technology and/or methods known in the art. The Fischer-Tropsch feedstock is hydrogen and carbon monoxide, i.e., syngas. The hydrogen to carbon monoxide molar ratio is generally deliberately adjusted to a desired ratio of approximately 2:1, but can vary between 0.5 and 4. The syngas is then contacted with a Fischer-Tropsch catalyst. Fischer-Tropsch catalysts are well known in the art and generally comprise a catalytically active metal, a promoter and a support structure. The most common catalytic metals are Group VIII metals, such as cobalt, nickel, ruthenium, and iron or mixtures thereof. The support is generally alumina, titania, zirconia or mixtures thereof. Fischer-Tropsch reactors use fixed and fluid type conventional catalyst beds as well as slurry bubble columns. The literature is replete with particular embodiments of Fischer-Tropsch reactors and Fischer-Tropsch catalyst compositions. As the mixed feedstocks contact the catalyst the hydrocarbon synthesis reactions take place. The Fischer-Tropsch product contains a wide distribution of hydrocarbon products from $C_5$ to greater than $C_{100}$.

The Synthesis reactor 145 or 195 can comprise any of the reactors known in the art, which produce alcohols, particularly methanol when using syngas as feedstock.

It should be appreciated that other suitable reducing gases, such as methane, natural gas, light hydrocarbons, can be used to perform the regeneration step. If methane were the regeneration gas selected, the oxygen feedstock would be reduced or eliminated to create a substantially methane stream into the deactivated syngas catalyst bed. Alternatively, the methane may come from stored gas, bottled gas or a slip stream of methane gas from some other source, such as a separate feedstock stream from a second syngas reactor. Also, unreacted methane may be recovered and used from tail-gas of any available process.

Figure 2:
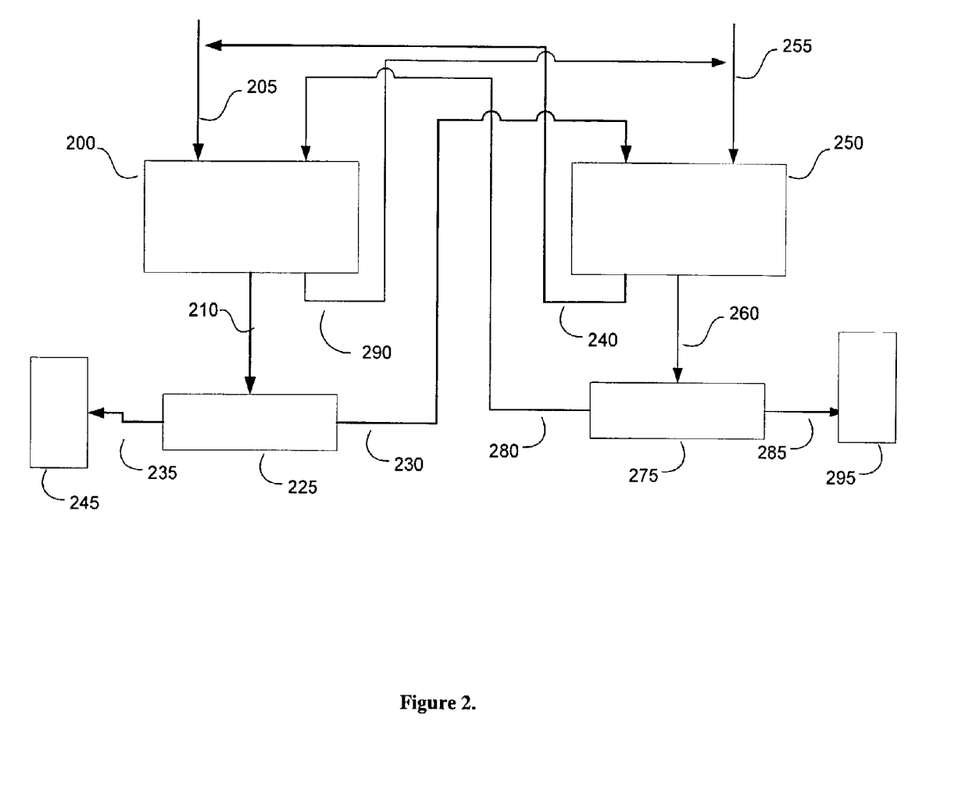
FIG. 2 is a block flow diagram of a hydrocarbon gas to liquid conversion process in accordance with one embodiment of the present invention.

In another embodiment of the present invention, the regeneration process described above may use oxidative gases for regeneration rather than reducing gases, such as oxygen, steam or air, with or without other inert gases for safety/dilution purposes. Referring now to FIG. 2, an in-situ process using oxygen would be possible in which a hydrocarbon containing gas and oxygen containing gas are introduced into a first syngas reactor 200 through line 205. The syngas feedstocks are catalytically reacted in a first syngas reactor 200 to produce primarily hydrogen and carbon monoxide, i.e., syngas.

The produced syngas exits through line 210 and is then passed to a synthesis reactor 245 via line 220. At least a portion of the syngas, preferably the entire stream, is passed into a gas separation unit 225. The type of separation used in unit 225 is not critical to the present invention and may include any physical and/or chemical means of separation such as oxygen selective membranes and any other techniques known or used in the art. In the most preferred embodiment, gas separation unit 225 comprises a membrane separator. Membranes are well known in the art to be highly selective to oxygen, typically greater than 70%. Thus, the gas separation unit 225 produces an oxygen rich stream 230 and a secondary syngas stream 235. The secondary syngas stream exits the gas separation unit 225 through line 235 and is sent to the synthesis reactor 245.

In accordance with the most preferred embodiment of the present invention, the oxygen rich stream is removed and introduced into a second syngas reactor 250 via line 230. The oxygen rich gas is passed over a syngas catalyst located within second syngas reactor 250 for regeneration or activation of the syngas catalyst. The excess oxygen rich gas will pass through the second syngas reactor 250 and exit though line 240. The excess oxygen rich gas can be recycled and used as syngas feedstock, sent to flare, or released into the atmosphere.

According to the present invention, the time necessary for in-situ regeneration of the syngas catalyst in reactor 250 will be primarily dependent on the volume of catalyst and flow and concentration of hydrogen passing over the catalyst. Under normal operating conditions, i.e., the. space velocities for the gas flow, stated as gas hourly space velocity (GHSV), from about 20,000 to about 100,000,000 $hr^{-1}$, preferably from about 100,000 to about 25,000,000 $hr^{-1}$ a temperature of about 25° C. to about 1500° C., preferably less than 1000° C., more preferably less than 600° C., and a pressure of about 25 psig to about 250 psig, it is anticipated that the time necessary to regenerate a catalyst bed of less than 1 foot in length will be less than 24 hours. Once regenerated, the second syngas reactor 250 can be used to produce syngas for the regeneration of the catalyst in the first syngas reactor 200 when the catalyst becomes deactivated. The process described above is simply reversed as described below.

The syngas feedstocks are introduced into the second syngas reactor 250 through line 255. The syngas feedstocks are catalytically reacted in syngas reactor 250 to produce syngas. The produced syngas exits through line 260 and is then passed into a gas separation unit 275. Thus, the gas separation unit 275 will produce an oxygen rich stream 280 and a secondary syngas stream 285. The secondary syngas stream exits the gas separation unit 275 through line 285 and is sent to the synthesis reactor 295.

The oxygen rich stream is removed and introduced into the first syngas reactor 200 via line 280. The oxygen rich gas is passed over a syngas catalyst located with the first syngas reactor 200 for regeneration or activation of the syngas catalyst. The excess oxygen rich gas will pass through the first syngas reactor 200 and exit though line 290. The excess oxygen rich gas can be recycled and used as syngas feedstock, sent to flare, or released into the atmosphere.

The synthesis reactor 245 or 295 can comprise any of the Fischer-Tropsch technology and/or methods known in the art as described above with respect to the regeneration embodiment using hydrogen.

Alternatively, the regeneration process may be carried out with a single syngas reactor design. For example, in another embodiment of the present invention, a single syngas reactor can be operated in cyclic mode in which the reactor simply alternates between reaction and regeneration operating conditions. The regeneration gas needed for the process may come from bottled gas or other suitable regeneration gases available from other plant processes on site. Once deactivation of a catalyst is detected, the syngas reactant feedstocks would be replaced with the available regeneration gas for a period of time sufficient to restore some or all of the activity to the deactivated catalyst. It should be appreciated that with a given volume, type and composition of catalyst, the necessity for a regeneration cycle can become quite predictable. Thus, no actual detection of deactivation is necessary, simply the understanding that at some given point in time a regeneration cycle is warranted and can be carried out. It is believed that this process would be necessary only on a weekly if not longer basis, resulting in very little down time for syngas production. In addition, depending upon the flow rates and volume of the syngas catalyst bed, the downtime should be insignificant against the total time for available for production. For example, a regeneration cycle may constitute only a three-hour period of time in an entire week.

In another embodiment of the present invention, a multiple step regeneration process may be used. Preferred steps would be to subject the deactivated catalyst first to oxidation by exposure to an oxidizing gas, such as water, steam, oxygen, air, etc., followed by a reduction step by exposure to a reducing gas, such as methane or hydrogen. Air and methane are the preferred gases due to their low cost and availability. This type of multiple step regeneration can be performed under the multiple reactor design or when using a single reactor in cyclic mode. In addition, one of ordinary skill in the art could easily apply the spirit of the embodiments as described in connection with the flow diagrams of FIGS. 1 and 2 to produce a combined process for in-situ multiple step regeneration. For example, the syngas lines exiting the syngas reactors could have a valve that allowed the syngas product to be sent either to a hydrogen separation unit or an oxygen separation unit such that the appropriate regeneration gas could be obtained for the process.

The present invention will be more easily and fully understood by the following example. The example is representative of the regeneration process in accordance with one embodiment of the preferred present invention.

EXAMPLE

A 4 wt % Rh/4 wt % Sm catalyst was tested at a natural gas:oxygen ratio of 1.82:1 at weight hour space velocities (WHSV) of 530 and 940 $hr^{-1}$ and pressures of 45 and 90 psig (412 and 722 kPa), respectively. The weight hour space velocity is defined by the weight of reactant feed per hour divided by the weight of catalyst. The partial oxidation reaction was carried out in a conventional flow apparatus using a 12.7 mm I.D. quartz insert embedded inside a refractory-lined steel vessel. The quartz insert contained a catalyst bed containing a 9.5 mm catalyst bed held between two inert 80 ppi alumina foams. The reactor effluent was analyzed using a chromatograph equipped with a thermal conductivity detector.

The catalyst was tested for 24 hours at 45 psig (412 kPa), after which a pressure drop of 3.3 psi was observed. The pressure was then increased to 90 psig (722 kPa) for 1.5 hours and an increase in pressure drop to 6.2 psi was observed, as shown in Table 1. An increase in pressure is indicative of at least one deactivation phenomenon, i.e., carbon deposition. Consequently, at the point of the increase in pressure drop, the methane conversion as well as the CO and $H_2$ selectivity values were decreasing. The reaction was quenched. The catalyst was then treated with 18% molar oxygen in nitrogen for 1-hour at 300° C. and the syngas reaction was re-initiated at a pressure of 90 psig. A pressure drop of 4.0 psi was observed immediately upon re-initiation. After 19 hours of syngas production, the pressure drop had leveled out at 2.5 psi, indicating that the syngas reactant feeds were able to continue the process of improving pressure drop and methane conversion that was initiated by the 1-hour oxygen treatment.

TABLE 1

|  | Pressure Drop (psi) | $CH_4$ Conv. | Selectivity CO | Selectivity $H_2$ |
|---|---|---|---|---|
| After 24 hours at 45 psig | 3.3 | 86.1 | 92.9 | 89.6 |
| After an additional 1.5 hours at 90 psig | 6.2 | 84.5 | 91.1 | 86.7 |
| Reaction quenched | — | — | — | — |
| Upon re-initiation of syngas production after 1 hour $O_2$ treatment | 4.0 | 85.5 | 92.6 | 88.4 |
| 19 hours after re-initiation of syngas production | 2.5 | 87.1 | 94.1 | 90.5 |

The data presented herein shows that the present invention is an improved process for the optimal production of a partial oxidation reactor. The data conforms to one of the preferred embodiments for optimizing a partial oxidation process. The optimization process comprises operating a partial oxidation reactor such that: (a) for some time, $t_1$, the reactor is fed a gas comprising hydrocarbon and oxygen and produces a product comprising synthesis gas at a pressure greater than or equal to at least two times ambient pressure, and (b) for some time, $t_2$, the catalyst in the reactor is regenerated using a regeneration gas, wherein the optimum operation occurs where $t_1$ is greater than or equal to twice $t_2$ and $t_1$ is greater than or equal to 24 hours. All other parameters are consistent with the preferred embodiments described herein. For example, the regeneration gas for the optimization process comprises one or more gases selected from the group consisting of oxygen, carbon monoxide, hydrogen and hydrocarbons.

It should be noted that the invention further includes an arrangement where at least a portion of any unused or produced gas from the regeneration reaction may be recycled into the syngas produced by a syngas reactor.

While preferred embodiments of this invention have been shown and described, modification thereof can be made by one skilled in the art without departing from the spirit or teaching of this invention. The embodiments described herein are exemplary only and are not limiting. For example, while syngas and Fischer-Tropsch reactions are explicitly referred to as part of the preferred embodiments, it is clear that any partial oxidation catalyst reactions and hydrocarbon or alcohol reactions, respectively, may be substituted without departing from the spirit of the invention. Many other variations and modifications of the system and apparatus are possible and are within the scope of this invention. Accordingly, the scope of protection is not limited to the embodiments described herein, but is only limited by the claims, which follow, the scope of which shall include all equivalents of the subject matter of the claims. In particular, unless order is explicitly recited, the recitation of steps in a claim is not intended to require that the steps be performed in any particular order, or that any step must be completed before the beginning of another step.

What is claimed is:

1. A hydrocarbon gas to liquid conversion process comprising:
    (a) in a first syngas reactor reacting a hydrocarbon containing gas and an oxygen containing gas under conditions effective to produce a gas stream comprising hydrogen and carbon monoxide;
    (b) regenerating a deactivated syngas catalyst with one or more regeneration gases in a second reactor;
    (c) reacting at least a portion of the gas stream from step (a) in a hydrocarbon synthesis reactor under conditions effective to produce liquid hydrocarbons; and
    (d) at least a portion of produced gas from the regeneration reaction in step (b) is recycled into the syngas stream produced in step (a).

2. The process according to claim 1 wherein steps (b) and (a) are carried out simultaneously.

3. The process according to claim 1 further including the step of reversing the reactors so as to produce hydrogen and carbon monoxide in the second reactor and regenerate deactivated catalyst in the first reactor.

4. The process according to claim 1 further including the steps of
    (d) diverting a slip stream portion from the gas stream comprising hydrogen and carbon monoxide generated in step (c);
    (e) separating the slip stream portion into a hydrogen stream comprised primarily of hydrogen and a stream comprised of the remainder, and
    (f) using the hydrogen stream generated in step (e) as one of the regeneration gases in step (b).

5. The process according to claim 1 wherein the regeneration gas comprises hydrogen.

6. The process according to claim 1 wherein the regeneration gas comprises molecular oxygen.

7. The process according to claim 1 wherein the regeneration gas comprises steam.

8. The process according to claim 1 the regeneration gas comprises syngas.

9. The process according to claim 1 wherein the regeneration gas comprises carbon monoxide.

10. The process according to claim 1 wherein the regeneration gas is methane.

11. The process according to claim 1 wherein the regeneration gas is a hydrocarbon-rich gas.

12. The process according to claim 1 further comprising additionally regenerating the deactivated catalyst in a second regeneration gas reaction either before, during or after step (b).

13. The process according to claim 1 wherein the regeneration gas is obtained from the group selected from: an oxygen containing gas, the synthesis gas produced in step (a), a Fischer-Tropsch tail-gas, a recycled gas, a stored gas, and mixtures thereof.

14. The process according to claim 1 further comprising that at least a portion of any unused gas from the regeneration reaction in step (b) be recycled into the syngas stream produced in step (a).

15. The process according to claim 1 further comprising that the regeneration gas in step (b) be obtained from either (i) the oxygen containing gas, (ii) the produced synthesis gas, (iii) a Fischer-Tropsch tail-gas, (iv) a recycled gas, (v) a stored gas, (vi) a hydroprocessing tail gas, (vii) an hydrogen-rich stream from an alcohol synthesis plant, or (viii) an hydrogen-rich stream from an olefin synthesis plant, (ix) an hydrogen-rich stream from a carbon filaments/carbon fibers synthesis plant, (x) an hydrogen-rich stream from an aromatic synthesis plant, or (xi) combinations thereof.

16. The process according to claim 14 wherein the regeneration gas in step (b) be obtained from either (i) the oxygen containing gas, (ii) the produced synthesis gas, (iii) a Fischer-Tropsch tail-gas, (iv) a recycled gas, or (v) a stored gas, (vi) a hydroprocessing tail gas, (vii) an hydrogen-rich stream from an alcohol synthesis plant, or (viii) an hydrogen-rich stream from an olefin synthesis plant, (ix) an hydrogen-rich stream from a carbon filaments/carbon fibers synthesis plant, (x) an hydrogen-rich stream from an aromatic synthesis plant, or (xi) combinations thereof.

17. The process according to claim 1 wherein the deactivated syngas catalyst comprises agglomerated metal clusters.

18. The process according to claim 1 wherein the deactivated syngas catalyst comprises a Group VIII metal.

19. The process according to claim 1 wherein the deactivated syngas catalyst comprises a noble metal.

20. The process according to claim 1 wherein the deactivated syngas catalyst comprises rhodium.

21. The process according to claim 17 wherein the deactivated syngas catalyst comprises rhodium.

22. The process according to claim 1 wherein the regeneration gas comprises one or more of a gas selected from the group consisting of hydrogen, carbon monoxide, oxygen and steam.

23. The process according to claim 1 wherein the regeneration gas comprises methane.

24. The process according to claim 1 wherein the regeneration gas is selected from the group consisting of methane, mixtures of $C_1$–$C_{10}$ hydrocarbons, natural gas and light hydrocarbons.

25. The process according to claim 1 wherein the deactivated syngas catalyst is contacted with one regeneration gas at from about 25° to about 1500° C.

26. The process according to claim 1 wherein the deactivated syngas catalyst is contacted with one regeneration gas at from about less than about 1000° C.

27. The process according to claim 1 wherein the deactivated syngas catalyst is contacted with one regeneration gas at less than about 600° C.

28. The process according to claim 1 further comprising contacting the deactivated syngas catalyst to a reducing gas.

29. A hydrocarbon gas to liquid conversion process comprising:
(a) in a first partial oxidation reactor reacting a bydrocarbon containing gas and an oxygen containing gas under conditions effective to produce a gas stream comprising hydrogen and carbon monoxide;
(b) producing a regeneration gas from any of the following sources selected from the group consisting of (i) the oxygen containing gas from step (a), (ii) the produced syngas stream in step (a), (iii) a Fiscber-Tropsch tail-gas, (iv) a recycled gas, (v) a stored gas, (vi) a hydroprocessing tail gas, (vii) an hydrogen-rich stream from an alcohol synthesis plant, or (viii) an hydrogen-rich stream from an olefin synthesis plant, (ix) an hydrogen-rich stream from a carbon filaments/carbon fibers synthesis plant, (x) an hydrogen-rich stream from an aromatic synthesis plant, or (xi) combinations thereof;
(c) regenerating a deactivated partial oxidation catalyst with one or more regeneration gases in a second reactor; and
(d) reacting at least a portion of the gas stream from step (a) in a hydrocarbon synthesis reactor under conditions effective to produce liquid hydrocarbons; and
(e) at least a portion of produced gas from the regeneration reaction in step (c) is recycled into the syngas stream produced in step (a).

30. A hydrocarbon gas to liquid conversion process comprising:
(a) operating a syngas reactor in cyclic mode between a reaction step and an in-situ regeneration step by alternating reaction and regeneration operating conditions, wherein the reaction step comprises reacting a hydrocarbon containing gas and an oxygen containing gas over a partial oxidation catalyst under conditions effective to produce a product comprising hydrogen and carbon monoxide, and such that after a period of time, the partial oxidation catalyst is deactivated, and wherein the in-situ regeneration step comprises regenerating the deactivated partial oxidation catalyst in said syngas reactor with one or more regeneration gases by exposing deactivated partial oxidation catalyst to one ore more regeneration gases;
(b) reacting at least a portion of the product comprising hydrogen and carbon monoxide produced in step (a) in a hydrocarbon synthesis reactor under conditions effective to produce liquid hydrocarbons; and
(c) at least a portion of produced gas from the regeneration reaction in step (a) is added to hydrocarbon containing gas for producing hydrogen and carbon monoxide.

31. The process according to claim 30 wherein the syngas reactor is operated in an optimized manner such that:
(a) for some time, $t_1$, the syngas reactor is fed the hydrocarbon containing gas and oxygen and produces the product comprising synthesis gas at a pressure greater than or equal to at least two times ambient pressure; and
(b) for some time, $t_2$, the catalyst in the syngas reactor is regenerated using a regeneration gas, wherein the optimum operation occurs where $t_1$ is greater than or equal to twice $t_2$ and $t_1$ is greater than or equal to 24 hours.

32. The process of claim 31 wherein the regeneration gas comprises one or more gases selected from the group consisting of oxygen, carbon monoxide, hydrogen and light hydrocarbons.

33. The process of claim 30 wherein the regeneration step comprising exposing the deactivated partial oxidation catalyst to more than one type of regeneration gas in a stepwise fashion.

34. The process of claim 33 wherein the regeneration step comprising first exposing the deactivated partial oxidation catalyst to an oxidizing gas, then exposing to a reducing gas to an oxidizing gas.

35. The process of claim 34 wherein the oxidizing gas is water, steam, oxygen, or air, and the reducing gas is methane or hydrogen.

36. The process of claim 30 wherein the oxygen containing gas used in step (a) is oxygen.

37. The process of claim 1 wherein the oxygen containing gas used in step (a) is oxygen.

38. The process according to claim 30 wherein the deactivated syngas catalyst comprises a catalytic metal, and wherein the in situ regenerating step is intermittent and comprising regenerating the deactivated syngas catalyst by chemical re-dispersion of the catalytic metal by exposing the deactivated syngas catalyst to a re-dispersing gas for a time sufficient to re-disperse the catalytic metal, said re-dispersing gas being one regeneration gas.

39. The process according to claim 38 wherein the deactivated syngas catalyst comprises agglomerated metal clusters.

40. The process according to claim 38 wherein the deactivated syngas catalyst comprises a Group VIII metal.

41. The process according to claim 38 wherein the catalytic metal comprises rhodium.

42. The process according to claim 38 wherein the re-dispersion gas comprises carbon monoxide.

43. The process according to claim 38 the re-dispersion gas comprises hydrogen.

44. The process according to claim 38 wherein the re-dispersion gas comprises oxygen.

45. The process according to claim 38 wherein the re-dispersion gas comprises steam.

46. The process according to claim 38 wherein the deactivated syngas catalyst is contacted with said re-dispersing gas at from about 25° to about 1500° C.

47. The process according to claim 38 wherein the deactivated syngas catalyst is contacted with said re-dispersing gas at from about less than about 1000° C.

48. The process according to claim 38 wherein the deactivated syngas catalyst is contacted with said re-dispersing gas at less than about 600° C.

49. The process according to claim 42 further comprising contacting the deactivated syngas catalyst to a reducing gas.

50. The process according to claim 42 further comprising contacting the deactivated syngas catalyst to hydrogen.

51. The process according to claim 38 wherein the process is carried out in a single vessel run in cyclic mode.

* * * * *